(12) United States Patent
Stach

(10) Patent No.: US 12,181,087 B2
(45) Date of Patent: Dec. 31, 2024

(54) INSERT PIECE FOR INSERTING INTO A RAPID CONNECTOR DEVICE FOR FLUID LINES

(71) Applicant: NORMA Germany GmbH, Maintal (DE)

(72) Inventor: Michal Stach, Sławniów (PL)

(73) Assignee: Norma Germany GmbH, Maintal (DE)

( * ) Notice: Subject to any disclaimer, the term of this patent is extended or adjusted under 35 U.S.C. 154(b) by 110 days.

(21) Appl. No.: 17/601,263

(22) PCT Filed: Mar. 23, 2020

(86) PCT No.: PCT/EP2020/058002
§ 371 (c)(1),
(2) Date: Oct. 4, 2021

(87) PCT Pub. No.: WO2020/200886
PCT Pub. Date: Oct. 8, 2020

(65) Prior Publication Data
US 2022/0178478 A1     Jun. 9, 2022

(30) Foreign Application Priority Data
Apr. 3, 2019   (DE) .................. 10 2019 108 768.6

(51) Int. Cl.
*F16L 37/02*     (2006.01)

(52) U.S. Cl.
CPC ................................ *F16L 37/025* (2013.01)

(58) Field of Classification Search
CPC ...... F16L 37/02; F16L 37/025; F16L 37/0885; F16L 37/144; F16L 21/03; F16L 21/04
See application file for complete search history.

(56) References Cited

U.S. PATENT DOCUMENTS

| 4,869,534 A | 9/1989 | Ketcham et al. |
| 5,058,907 A | 10/1991 | Percebois et al. |

(Continued)

FOREIGN PATENT DOCUMENTS

| DE | 69500693 T2 | 4/1998 |
| DE | 112014005198 T5 | 8/2016 |

(Continued)

OTHER PUBLICATIONS

Japanese Office Action for Japanese Application No. 2021-568040 dated Nov. 22, 2022 (6 pages).

(Continued)

*Primary Examiner* — Zachary T Dragicevich
(74) *Attorney, Agent, or Firm* — REISING ETHINGTON, P.C.

(57) ABSTRACT

An insert piece for inserting into a rapid connector device for fluid lines. The insert piece comprises a hollow cylindrical main part, and the hollow cylindrical main part extends between a front annular surface and a rear annular surface along a cylinder axis and has a passage opening extending along the cylinder axis and an outer lateral surface for arranging on the inner wall of a rapid connector device The passage opening has a passage section which expands in the direction of the front annular surface. The insert piece can prevent a fluid line and/or a rapid connector device from being damaged.

14 Claims, 2 Drawing Sheets

(56) References Cited

U.S. PATENT DOCUMENTS

| | | | | |
|---|---|---|---|---|
| 5,857,718 | A * | 1/1999 | Kleinschmidt | F16L 37/144 285/305 |
| 5,895,078 | A | 4/1999 | Le Clinche | |
| 7,354,079 | B2 | 4/2008 | Rehder et al. | |
| 8,282,139 | B2 | 10/2012 | Kerin et al. | |
| 10,156,308 | B2 | 12/2018 | Nezu | |
| 10,323,782 | B2 | 6/2019 | Hatanaka | |
| 2004/0036282 | A1 * | 2/2004 | Rohde | F16L 37/0885 285/305 |
| 2004/0061330 | A1 * | 4/2004 | Okada | F16L 37/144 285/305 |
| 2004/0183301 | A1 | 9/2004 | Yoshida | |
| 2005/0093298 | A1 | 5/2005 | Takayanagi | |
| 2008/0028586 | A1 | 2/2008 | Blivet et al. | |
| 2008/0277929 | A1 * | 11/2008 | Bucher | F16L 37/0885 285/317 |
| 2008/0279621 | A1 * | 11/2008 | Chaupin | F16L 37/144 403/345 |
| 2010/0007142 | A1 * | 1/2010 | Ogawa | F16L 37/144 285/317 |
| 2010/0052313 | A1 * | 3/2010 | Ishida | F16L 37/0885 285/308 |
| 2011/0127766 | A1 * | 6/2011 | Tsurumi | F16L 37/144 285/305 |
| 2012/0104746 | A1 * | 5/2012 | Fansler | F16L 37/0885 |
| 2013/0221665 | A1 * | 8/2013 | Okazaki | F16L 37/144 285/317 |
| 2017/0356581 | A1 * | 12/2017 | Trotter | F16L 37/0885 |
| 2019/0063658 | A1 | 2/2019 | Jacksteit et al. | |

FOREIGN PATENT DOCUMENTS

| | | |
|---|---|---|
| EP | 0406144 A1 | 1/1991 |
| EP | 2871398 A1 | 5/2015 |
| EP | 3450812 A1 | 3/2019 |
| JP | 2005106207 A | 4/2005 |
| JP | 2006214495 A | 8/2006 |
| JP | 2007327634 A | 12/2007 |
| JP | 2010203611 A | 9/2010 |
| JP | 2011174615 A | 9/2011 |
| JP | 2012052574 A | 3/2012 |
| JP | 2014015969 A | 1/2014 |
| JP | 2014196827 A | 10/2014 |

OTHER PUBLICATIONS

English Translation of Japanese Office Action for Japanese Application No. 2021-568040 dated Nov. 22, 2022 (4 pages).
German Office Action for German Application No. 10 2019 108 768.6 dated Feb. 28, 2020 (3 pages).
International Search Report for International Application No. PCT/EP2020/058002 dated May 11, 2020 (3 pages).
English Translation of International Search Report for International Application No. PCT/EP2020/058002 dated May 11, 2020 (2 pages).
Chinese Office Action for Chinese Application No. 202080025880.1 dated Feb. 10, 2023 (7 pages).
Korean Office Action for Korean Application No. 10-2021-7035834 dated Jul. 1, 2023 (6 pages).
English Translation of Korean Office Action for Korean Application No. 10-2021-7035834 dated Jul. 1, 2023 (5 pages).
European Office Action for European Application No. 20713619.3-1015 dated Jul. 20, 2023 (4 pages).
Korean Office Action for Korean Application No. 10-2021-7035834 dated Oct. 3, 2023 (4 pages).
English Translation of Korean Office Action for Korean Application No. 10-2021-7035834 dated Oct. 3, 2023 (2 pages).

* cited by examiner

INSERT PIECE FOR INSERTING INTO A RAPID CONNECTOR DEVICE FOR FLUID LINES

INTRODUCTION

The disclosure relates to an insert piece for insertion into a quick-action connector device for fluid lines.

For connecting fluid lines which are generally produced from plastic material, use is commonly made of quick-action connector devices, in particular in the automotive industry. Here, the quick-action connector devices have tube sections into which the fluid lines are introduced and fastened. In this case, welding rings are used in the quick-action connector devices to connect the fluid line introduced to the quick-action connector. Here, the welding ring is heated and partially or completely melted. In the process, the material of the welding ring bears snugly against the fluid line and against an inner wall of the quick-action connector device. After cooling down, the material solidifies and connects the fluid line to the quick-action connector device.

The welding ring is introduced prior to the introduction of the fluid line into the quick-action connector device. Here, the welding ring has an outer diameter which is minimally larger than the inner diameter of the quick-action connector device. This has the effect that the welding ring bears against an inner wall of the quick-action connector device. Furthermore, the inner wall may have a depression, or groove, in which the welding ring is arranged, so as to fix the position of the latter on the inner wall. The fluid line is in this case guided through the welding ring and has an outer diameter which matches an inner diameter of the welding ring. When the fluid line is introduced, however, damage to the welding ring, the fluid line and/or the quick-action connector device can occur.

SUMMARY

It is therefore an object per an embodiment of the disclosure to provide an improved device which avoids damage to the fluid line and/or to the quick-action connector device.

The disclosure, per an embodiment, provides an insert piece for insertion into a quick-action connector device for fluid lines, wherein the insert piece comprises a hollow-cylindrical main body, wherein the hollow-cylindrical main body extends between a front ring surface and a rear ring surface along a cylinder axis and has a passage opening extending along the cylinder axis and has an outer lateral surface for arrangement on an inner wall of a quick-action connector device, wherein it is provided according to an embodiment that the passage opening has a passage section which widens in the direction of the front ring surface.

With the disclosure, per an embodiment, an insert piece which, by means of the passage section that widens in the direction of the front ring surface, has, at the passage opening, an inclined surface in relation to the outer lateral surface is provided. Here, the passage opening is delimited by an inner lateral surface of the hollow-cylindrical main body. Furthermore, the outer lateral surface may be formed to be parallel to the cylinder axis. Furthermore, the front and rear ring surfaces may be oriented perpendicularly to the cylinder axis. By means of the outer lateral surface, the insert piece may be arranged on an inner wall of a quick-action connector device, wherein the front ring surface is directed toward an entry opening of the quick-action connector device. In other words, the outer lateral surface bears against the inner wall of the quick-action connector device after the insert piece has been inserted properly into the quick-action connector device. When the outer lateral surface bears against the inner wall of the quick-action connector device, the passage section thus likewise provides an inclined surface in relation to the inner wall. With the introduction of a fluid line which is not oriented exactly toward the passage opening, the fluid line passes the front ring surface and then firstly makes contact with the insert piece at the passage section. Owing to the widening shape of the passage section, the force which is transmitted by the fluid line due to the contact with the insert piece can be divided into a component oriented parallel to the inner wall and into a component oriented perpendicularly to the inner wall. Thus, a part of the force transmitted by the fluid line to the insert piece acts perpendicularly to the inner wall and pushes the insert piece against the inner wall. Thus, only a part of the force is associated with the parallel component and brings about shearing of the insert piece parallel to the cylinder axis at the section of the insert piece which is in contact with the fluid line. Thus, the shear forces acting on the insert piece when fluid lines are introduced are reduced. This reduces mechanical stress in the insert piece, so that a risk of breakage of the insert piece is likewise reduced. The risk of fragments damaging the fluid line or the quick-action connector device is thus reduced. Consequently, damage to the fluid line and the quick-action connector device is avoided. Here, the insert piece may be an insert ring for quick-action connector devices for fluid lines.

Furthermore, from the front ring surface, the passage section has a narrowed portion, so that the fluid line is guided into the passage opening by the inclined surfaces of the passage section. Furthermore, owing to the passage section, a longitudinal axis of the fluid line may have an angle of up to 5° in relation to the cylinder axis without the introduction of the fluid line into the passage opening being made more difficult or blocked. The introduction of fluid lines into quick-action connector devices having the insert piece is thus facilitated.

The passage section may furthermore have a round edge on the front ring surface.

Thus, the front ring surface and that surface of the hollow-cylindrical main body which delimits the passage section transition into one another. Thus, in the direction of the front ring surface, the rate of widening of the passage section increases at the round edge with decreasing distance from the front ring surface. Thus, when being introduced into the insert piece, a fluid line makes contact not with a sharp edge or with the front ring surface, which is arranged perpendicularly to the cylinder axis, but with the round edge. Here, the round edge, like those surfaces of the main body which delimit the passage section, has the effect that a force transmitted by the introduced fluid line is in part directed perpendicularly to the inner wall of the quick-action connector device. The round edge furthermore brings about improved guidance of force in the insert piece itself, per an embodiment. That is to say, if a fluid line transmits a force behind the round edge at the passage section, there is less stress at the round edge than at a sharp edge. Thus, the round edge further reduces the shear forces on the insert piece, per an embodiment.

Furthermore, the hollow-cylindrical main body may have a bevel which extends in a ring-shaped manner around the passage section and which delimits the passage section radially at the hollow-cylindrical main body. Here, the round edge may connect the front ring surface to the bevel.

The bevel may in this case be part of the inner lateral surface on the hollow-cylindrical main body and defines the passage section. A bevel can, without great effort, be formed in a workpiece at a later stage or, in the case of extruded objects, already be provided by the mold for the workpiece to be produced. This facilitates the production of the insert piece.

The insert piece may furthermore comprise a material which is reinforced with fibers. The fibers may comprise glass fibers.

The fibers have the effect that external forces on the insert piece are optimally distributed within the insert piece. Furthermore, the fibers may be configured in such a way that the proportion of the forces acting at the passage section of the insert piece that is directed toward the inner wall of the quick-action connector device is increased.

Here, the material may have a fiber content of between 0% and 70%, preferably of between 0% and 50%, per some embodiments.

By way of the fiber content of the material, the proportion of the forces that is directed perpendicularly to the inner wall by the insert piece can be set. It is thus possible for the proportions of force that induce stress in the insert piece or at the quick-action connector device to be set. This allows an optimum stress distribution to be selected, so that the risk of damage is further reduced.

The ring surfaces may have at least an inner diameter of between 13 mm and 15 mm, preferably an inner diameter of 14 mm, per some embodiments.

Thus, in an embodiment, an insert piece for fluid lines with a nominal width of 14 mm can be provided.

A further aspect of an embodiment of the disclosure relates to a system for connecting fluid lines, wherein the system has an insert piece according to the above description and a quick-action connector device for fluid lines, wherein the quick-action connector device has an entry opening and an inner wall which extends from the entry opening into the quick-action connector device, wherein the insert piece is arranged on the inner wall by way of the outer lateral surface, wherein the front ring surface is directed toward the entry opening.

Advantages and effects and refinements of the system, per certain embodiments, emerge from the advantages and effects and refinements of the insert piece described above. Therefore, in this respect, reference is made to the previous description.

The system may have a fluid line with an end piece, wherein the end piece has an outer diameter whose magnitude is between a maximum diameter at the passage section and a minimum diameter of the passage opening.

The outer diameter can thus be guided through the passage section. Here, the fluid line is guided into the passage opening by way of the end piece from that side of the insert piece on which the front ring surface is arranged. In the direction of introduction of the end piece, the passage section narrows and guides the end piece in the passage opening. Since the end piece has a larger outer diameter than the diameter of the passage opening at its minimum diameter, when the fluid line is guided through the passage opening, a high level of friction is formed at this position, wherein the materials of the fluid line and of the insert piece can slightly elastically, or else plastically, deform. Here, the materials may comprise plastics. After the fluid line has been arranged through the passage opening in the intended position, the friction between the minimum diameter of the passage opening and the outer diameter of the end piece has the effect that the fluid line is held in the quick-action connector device by means of the insert piece. A welding process can therefore be avoided, which saves time and costs.

Furthermore, the nominal width of the fluid line may be between 1 mm and 30 mm, preferably 14 mm, per some embodiments.

Here, the fluid line and the quick-action connector device may be connected to one another at an angle of between 0° and 10°, preferably of between 0° and 5°, per some embodiments.

Thus, the fluid line can be introduced into the quick-action connector device at an angle and connected to the quick-action connector device at this angle. This simplifies the connection of fluid lines to the quick-action connector device.

BRIEF DESCRIPTION OF THE FIGURES

Further features, details and advantages of embodiments of the disclosure emerge from the wording of the claims and from the following description of exemplary embodiments on the basis of the drawings, in which:

DETAILED DESCRIPTION

Figure 1A:
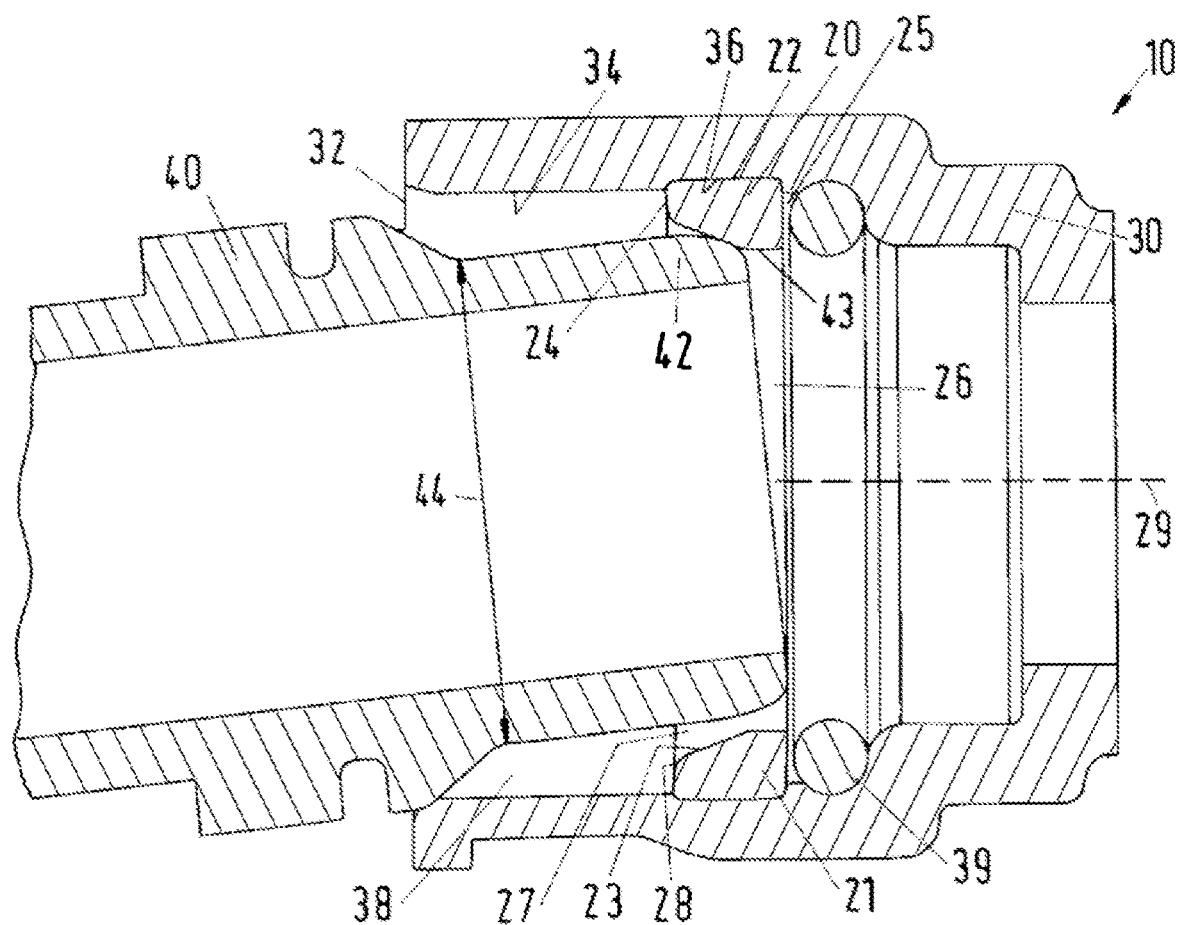
FIGS. 1a, b show schematic sectional illustrations of the system.

FIG. 1a shows a system 10 for connecting fluid lines, wherein the system 10 comprises a quick-action connector device 30, a fluid line 40 and an insert piece 20. Here, the insert piece 20 is arranged in the quick-action connector device 30, wherein the fluid line 40 is connected to the quick-action connector device 30 by means of the insert piece 20.

The quick-action connector device 30 has a chamber 38 which comprises an entry opening 32 through which the insert piece 20 and the fluid line 40 can be introduced into the chamber 38 of the quick-action connector device 30. The chamber 38 is delimited by an inner wall 34 of the quick-action connector device 30, wherein the inner wall 34 is shaped like an inner lateral surface of a hollow cylinder. On the inner wall 34, there is furthermore arranged a depression 36 which is configured for receiving an insert piece 20. Arranged behind the depression 36, from the entry opening 32, is a seal 39 in the form of an O-ring.

The insert piece 20 is arranged in the depression 36. The insert piece 20 comprises a hollow-cylindrical main body 21, that is to say the insert piece 20 has the shape of a ring. Here, the hollow-cylindrical main body 21 extends between a front ring surface 24 and a rear ring surface 25 along a cylinder axis 29. Here, the front ring surface 24 is directed toward the entry opening 32. Furthermore, the front ring surface 24 and the rear ring surface 25 are oriented perpendicularly to the cylinder axis 29.

The hollow-cylindrical main body 21 furthermore comprises an outer lateral surface 22 for arrangement on an inner wall of a quick-action connector device. The outer lateral surface 22 is oriented parallel to the cylinder axis 29. In FIG. 1a, the outer lateral surface 22 is arranged on the inner wall 34 of the quick-action connector device 30. Here, the outer lateral surface 22 has a diameter which is minimally larger than a diameter defined by the inner wall 34 of the quick-action connector device 30. The ring surfaces 24, 25 have the same outer diameter as the outer lateral surface. In this way, the entire lateral surface 22 is pushed against the inner wall 34. Here, the outer lateral surface 22 is arranged at least partially in the depression 36.

The ring opening of the hollow-cylindrical main body 21 is formed by a passage opening 26 which extends along the cylinder axis 29. An inner lateral surface 43 of the hollow-cylindrical main body 21 delimits the passage opening 26 radially from the cylinder axis 29. The passage opening 26 extends here through the entire hollow-cylindrical main body 21 and connects the ring opening of the front ring surface 24 to the ring opening of the rear ring surface 25. In this example, the ring surfaces 24, 25 have at least an inner diameter of between 13 mm and 15 mm, preferably an inner diameter of 14 mm.

The passage opening 26 has a passage section 27 which narrows from the front ring surface 24. Formulated conversely, the passage section 27 widens in the direction of the front ring surface 24. In this example, as per FIG. 1a, the surface which defines the passage section 27 at the hollow-cylindrical main body 21 is a bevel 23. The bevel 23 extends over the entire circumference of the inner delimitation of the front ring surface 24 and may be a section of the inner lateral surface 43. Furthermore, from the front ring surface 24, the bevel 23 converges conically to that section of the passage opening 26 which is arranged outside the passage section 27.

The hollow-cylindrical main body 21 comprises a round edge 28 between the bevel 23 and the front ring surface 24. The round edge 28 connects the bevel 23 to the front ring surface 24. This means that the region between the bevel 23 and the front ring surface 24 is free of sharp edges.

The fluid line 40 has an end piece 42, which is arranged on the bevel 23 by way of an upper surface of the fluid line 40 in FIG. 1a. Here, FIG. 1a shows the introduction of the fluid line 40 into the quick-action connector device 30. Movement of the fluid line 40 to the right in FIG. 1a results in the bevel 23 guiding the fluid line 40, by means of the end piece 42, into the passage opening 26 through the passage section 27.

Here, it is not absolutely necessary for the fluid line 40 to be guided parallel to the cylinder axis 29 of the insert piece 20 to the passage opening 26. The passage section 27 has the effect that the fluid line 40, when being introduced, can be at an angle to the quick-action connector device 30. Furthermore, on account of the play which the passage section 27 provides owing to its widening toward the front ring surface 24, the fluid line 40 and the quick-action connector device 30 may be connected to one another at said angle. The angle may be between 0° and 10°, preferably between 0° and 5°. Thus, by means of the insert piece 20, a secure connection between the fluid line 40 and the quick-action connector device 30 is provided even with a connection position at a slight angle.

Figure 1B:
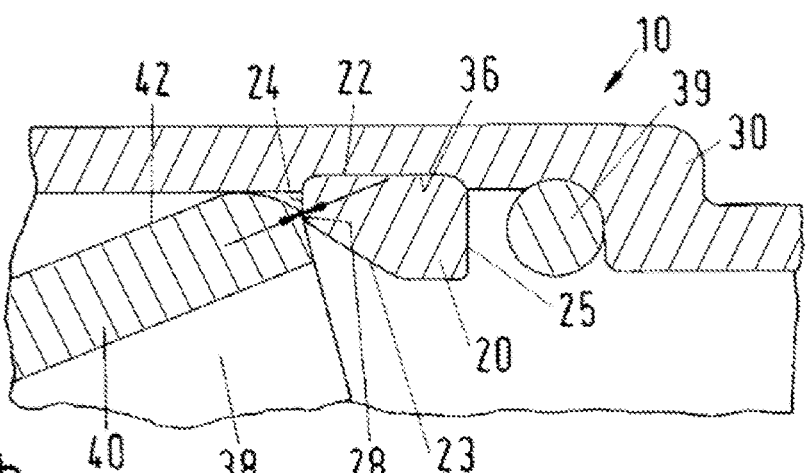

Upon contact with the insert piece 20, the fluid line 40 transmits a force to the insert piece 20. This is illustrated in FIG. 1b. The arrows point to the contact surfaces between the end piece 42 and the insert piece 20. In FIG. 1b, the contact between the fluid line 40 and the insert piece 20 is realized at the round edge 28. Here, the force which is transmitted by the fluid line 40 is directed along the arrows. Said force pushes the outer lateral surface 22 of the insert piece 20 at an angle to the inner wall 34 of the quick-action connector device 30. Here, the force has a component which is directed perpendicularly to the inner wall 34 and has a component which is directed parallel to the cylinder axis 29 or inner wall 34.

The bevel 23 brings about an effect analogous to that brought about by the round edge 28. Here, the bevel 23 likewise directs perpendicularly to the inner wall 34 via the outer lateral surface 22 a part of the force transmitted by the fluid line 40.

At least a part of the force transmitted by the fluid line 40 is transmitted perpendicularly to the inner wall 34 by the bevel 23 or by the round edge 28, and so not all of the force acts parallel to the cylinder axis 29 or inner wall 34. The reduction in the parallel component of the force has the effect of reducing a shearing action on the insert piece 20. The consequence of this is that the risk of breakage of the insert piece 20 is reduced. Since the insert piece 20 is held in a depression 31 against the inner wall 34, it is thus likewise the case that breakage of the edge of the depression 31 by way of a force transmitted by the fluid line 40 to the edge of the depression 31 via the insert piece 20 is avoided.

Figure 2A:
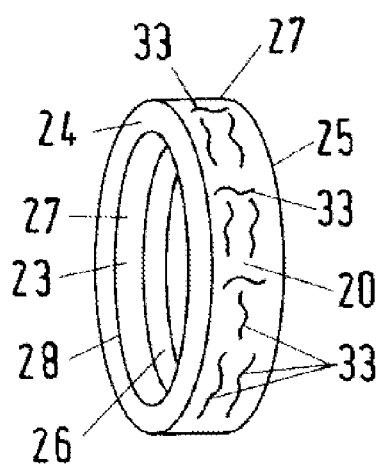
FIGS. 2a, b show different views of schematic illustrations of the insert piece.

Here, as per FIG. 2a, the insert piece 20 comprises a material which comprises fibers 33. The fibers 33 may be glass fibers. The fibers 33 are arranged in the material of the insert piece 20 in such a way that forces acting on the bevel 23 are transmitted at least in part in the direction of the outer lateral surface 22. That is to say, when the insert piece 20 is arranged in the quick-action connector device 30, a larger part of the force acting on the bevel 23 is transmitted to the inner wall 34 via the outer lateral surface 22 than in the case in which the material of the insert piece 20 has no fibers 33.

The material may in this case be a plastic. The insert piece 20 may thus consist of a fiber-reinforced plastic material.

By way of the proportion of the fibers 33 in the material, the division of the force transmitted by the fluid line 40 to the insert piece 20 and to the inner wall 34 into the component acting perpendicularly to the outer lateral surface 22 and into the component acting parallel to the cylinder axis 29 can be set. Here, the material may have a fiber content of between 0% and 70%, preferably of between 0% and 50%. The higher the fiber content of the fibers 33 in the material is, the greater the force transmitted perpendicularly to the outer lateral surface 22. Conversely, the fewer the fibers 33 the material has, the smaller the force transmitted perpendicularly to the outer lateral surface 22.

Figure 2B:
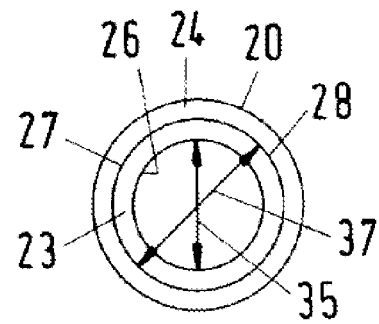

The fluid line 40 is designed in such a way that its outer diameter 44 has a magnitude lying between the one maximum diameter 37 at the passage section 27 and a minimum diameter 35 of the passage opening 26. The maximum diameter 37 and the minimum diameter 35 are illustrated in FIG. 2b.

Here, the nominal width of the fluid line 40 may be between 1 mm and 30 mm, preferably 14 mm.

As a result of the selected magnitude of the outer diameter 44, the fluid line 40 can be received by the passage section 27 and guided into the passage opening 26. In the passage opening 26, owing to the smaller minimum diameter 35 of the passage opening 26, the fluid line 40 is moved along the cylinder axis with increased expenditure of force in order to overcome the friction between the fluid line 40 and the walls of the passage opening 26 and to slightly deform the fluid line 40 and/or the insert piece 20.

The friction between the walls of the passage opening 26 and the fluid line 40 furthermore has the effect that the fluid line 40 is held in the insert piece 20 by means of frictional engagement in the quick-action connector device 30. Welding of the fluid line 40 to the quick-action connector device 30 is not required.

Figure 3:
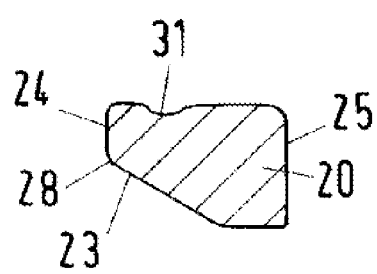
FIG. 3 shows a schematic cross-sectional illustration of the insert piece.
Figure 4:
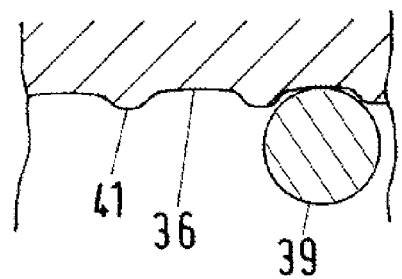
FIG. 4 shows a schematic cross-sectional illustration of an inner wall section.

FIG. 3 illustrates a cross section of a further exemplary embodiment of the insert piece 10. In this case, the outer lateral surface 22 of the insert piece 10 has a channel 31 which encircles the cylinder axis 29. The channel 31 can receive a bead 41 which is shaped in a manner fitting the channel 31 and which is arranged on the depression 36 of the quick-action connector device 30 and which extends along the inner wall 34 about the cylinder axis 29.

When the insert piece 20 is inserted into the depression 36, the insert piece 20 is firstly stopped at the bead 41 and has to be pushed over the bead 41 with an increased expenditure of force, wherein the insert piece 20 is elastically deformed at the bead 41. As soon as the bead 41 is arranged in the channel 31, the bead 41 holds the insert piece 20 in the quick-action connector device 30 at this position.

The bead 41, in combination with the depression 36, fixes the insert piece 20 at this position. Consequently, the insert piece 20 is held securely against the inner wall 34 and is not displaced along the inner wall 34 by forces acting parallel to the cylinder axis 29.

The invention is not restricted to one of the embodiments described above, but rather may be modified in a variety of ways.

All the features and advantages that emerge from the claims, from the description and from the drawing, including structural details, spatial arrangements and method steps, may be essential to the invention both individually and in a wide variety of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 System
20 Insert piece
21 Main body
22 Outer lateral surface
23 Bevel
24 Front ring surface
25 Rear ring surface
26 Passage opening
27 Passage section
28 Round edge
29 Cylinder axis
30 Quick-action connector device
31 Channel
32 Entry opening
33 Fiber
34 Inner wall
35 Minimum diameter
36 Depression
37 Maximum diameter
38 Chamber
39 Seal
40 Fluid line
41 Bead
42 End piece
43 Inner lateral surface
44 Outer diameter

The invention claimed is:

1. A system for connecting fluid lines, comprising:
a quick-action connector device having an entry opening and an inner wall extending from the entry opening into the quick-action connector device;
a fluid line having an end piece; and
an insert piece comprising:
  a hollow-cylindrical main body, wherein the hollow-cylindrical main body:
    extends along a cylinder axis between
      a front ring surface and
      a rear ring surface,
    has a passage opening extending along the cylinder axis, and
    has an outer lateral surface arranged in a depression arranged on the inner wall of the quick-action connector device such that the insert piece is arranged on the inner wall by way of the outer lateral surface,
wherein the passage opening has a passage section which widens in the direction of the front ring surface,
wherein the passage opening extends through the entire hollow-cylindrical main body and connects a ring opening of the front ring surface to a ring opening of the rear ring surface,
wherein the passage section has a rounded edge on the front ring surface,
wherein the hollow-cylindrical main body has a bevel which extends in a ring-shaped manner around the passage section and which delimits the passage section radially at the hollow-cylindrical main body,
wherein the bevel is a surface defining the passage section at the hollow-cylindrical main body,
wherein the bevel converges conically from the front ring surface to a section of the passage opening arranged outside the bevel,
wherein, when the fluid line is introduced into the quick-action connector device, the end piece of the fluid line is arranged on the bevel of the insert piece by way of an upper surface of the fluid line,
wherein, upon contact with the insert piece, the end piece of the fluid line transmits a force to the insert piece,
wherein the contact between the end piece of the fluid line and the insert piece is realized at the rounded edge, and
wherein the end piece has an outer diameter whose magnitude is between a maximum diameter at the passage section and a minimum diameter of the passage opening.

2. The system as claimed in claim 1, wherein the rounded edge connects the front ring surface to the bevel.

3. The system as claimed in claim 1, wherein the insert piece comprises a material which is reinforced with fibers.

4. The system as claimed in claim 3, wherein the fibers comprise glass fibers.

5. The system as claimed in claim 3, wherein the material has a fiber content of between 0% and 70%.

6. The system as claimed in claim 3, wherein the material has a fiber content of between 0% and 50%.

7. The system as claimed in claim 1, wherein the front and rear ring surfaces have at least an inner diameter of between 13 mm and 15 mm.

8. The system as claimed in claim 1, wherein a nominal width of the fluid line is between 1 mm and 30 mm.

9. The system as claimed in claim 8, wherein the nominal width of the fluid line is 14 mm.

10. The system as claimed in claim 1, wherein the fluid line and the quick-action connector device are connected to one another at an angle of between 0° and 10°.

11. The system as claimed in claim 1, wherein the front and rear ring surfaces have at least an inner diameter of 14 mm.

12. The system as claimed in claim 1, wherein the fluid line and the quick-action connector device are connected to one another at an angle of between 0° and 5°.

13. The system as claimed in claim 1, wherein the hollow-cylindrical main body has an inner lateral surface that radially delimits the passage opening and provides the section of the passage opening arranged outside the bevel.

14. The system as claimed in claim 13, wherein the inner lateral surface is parallel with the cylinder axis at the section of the passage opening arranged outside the bevel.

* * * * *